Dec. 12, 1967  R. C. GOODSELL  3,357,579
TRAILER

Filed Aug. 12, 1965  4 Sheets-Sheet 1

INVENTOR.
RAY C. GOODSELL
BY
Schmieding & Sultz
ATTORNEYS

INVENTOR.
RAY C. GOODSELL
BY
Schmieding & Fultz
ATTORNEYS

Dec. 12, 1967  R. C. GOODSELL  3,357,579
TRAILER
Filed Aug. 12, 1965  4 Sheets-Sheet 3
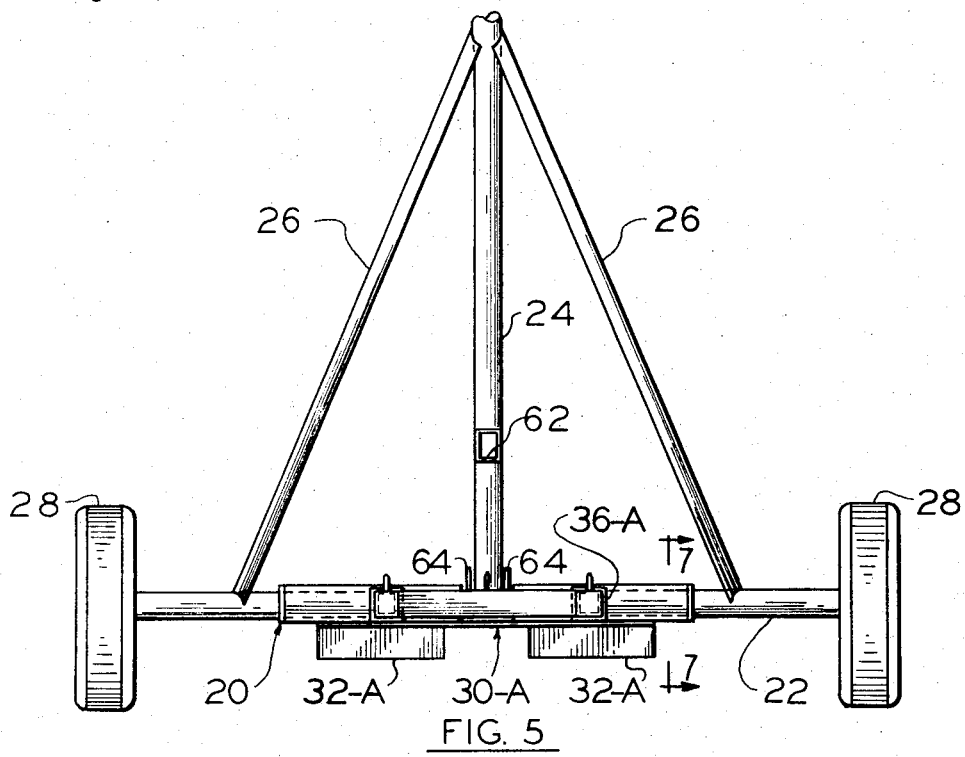
FIG. 5
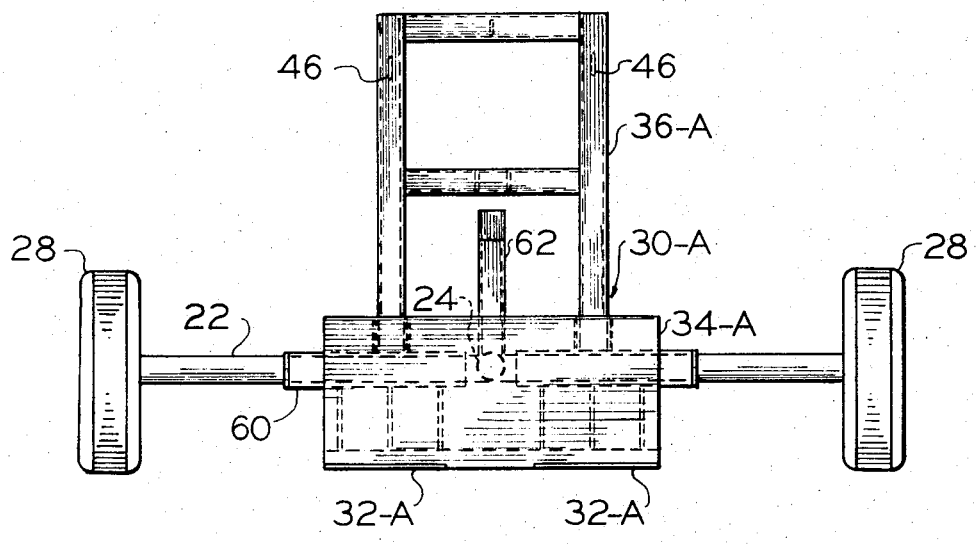
FIG. 6
FIG. 7
INVENTOR.
RAY C. GOODSELL
BY *Schmieding & Jultz*
ATTORNEYS Dec. 12, 1967   R. C. GOODSELL   3,357,579
TRAILER Filed Aug. 12, 1965   4 Sheets-Sheet 4

INVENTOR.
RAY C. GOODSELL
BY
Schmieding & Fultz
ATTORNEYS

United States Patent Office 3,357,579
Patented Dec. 12, 1967

3,357,579
TRAILER
Ray C. Goodsell, Rte. 2, Coopersville, Mich. 49404
Filed Aug. 12, 1965, Ser. No. 479,138
3 Claims. (Cl. 214—501)

ABSTRACT OF THE DISCLOSURE

A trailer type vehicle having a pivotally mounted foot and bed portion which is adapted to engage and lift a large substantially rectangularly shaped commercial refuse container onto the trailer for transportation. The foot and bed portion are formed substantially to conform to the containers to engage the container in supporting relationship during the lifting step as well as during transit.

---

The present invention relates generally to trailers and particularly to a novel trailer adapted to pick up and transport refuse containers.

In general, the trailer of the present invention comprises a frame means including a pair of wheels mounted on an axle and engagement means mounted on said frame means and pivotable about a horizontal axis for detachably engaging said container and lifting said container onto said frame means.

At present, the refuse industry comprises for the most part a great many individual operators. The size of operation of each varies from maintaining a few front loading lift and dump vehicles to a great many of such vehicles. Each operator must maintain a great many refuse containers which are located at each individual pickup site where the operator's clients may store refuse until the containers are emptied periodically by the lift and dump vehicles.

The refuse containers vary in standard sizes from two or three cubic yards to about eight cubic yards in volume. These containers must be delivered to new clients or new containers must be delivered to replace old ones. Also these containers must be picked up and transported to the operator's place of business for maintenance and repair and then returned to the client's place of business.

Heretofore, the containers were transported by the lift and dump vehicles used to empty these containers and collect refuse. As these vehicles are very expensive there is a great loss to the operator in both labor and time as the lift and dump vehicle had to be taken off its regular route. Further a skilled operator must be used to operate the lift and dump vehicle and overtime payments were necessary in many instances if the lift and dump vehicles could not be spared from regular routes during ordinary working hours.

It is therefore an object of the present invention to provide a novel low cost trailer for transporting refuse container which may be attached to any type vehicle.

It is another object of the present invention to provide a novel trailer for transporting refuse containers that includes detachable container engagement means whereby the container may be lifted onto the trailer and then transported to a given destination in a simple and economical manner.

It is another object of the present invention to provide a novel trailer for transporting refuse container of any standard size.

It is another object of the present invention to provide a novel trailer for transporting refuse containers which incorporates container engagement means which detachably engage any of the standard types of containers made by the many different manufacturers.

It is still another object of the present invention to provide a novel trailer for transporting refuse containers which is simple in construction and economical to manufacture and fabricate.

Further objects and advantages of the present invention will be apparent from the following description, reference being had to the accompanying drawings wherein preferred forms of embodiments of the invention are clearly shown.

In the drawings:

FIG. 5 is a modified embodiment of a trailer for transporting a refuse container constructed in accordance with the present invention;

FIG. 6 is a front elevational view of the trailer shown in FIG. 5;

FIG. 7 is a partial side sectional view of a portion of the trailer shown in FIG. 4 the section being taken along line 7—7 in FIG. 5;

Figure 1:
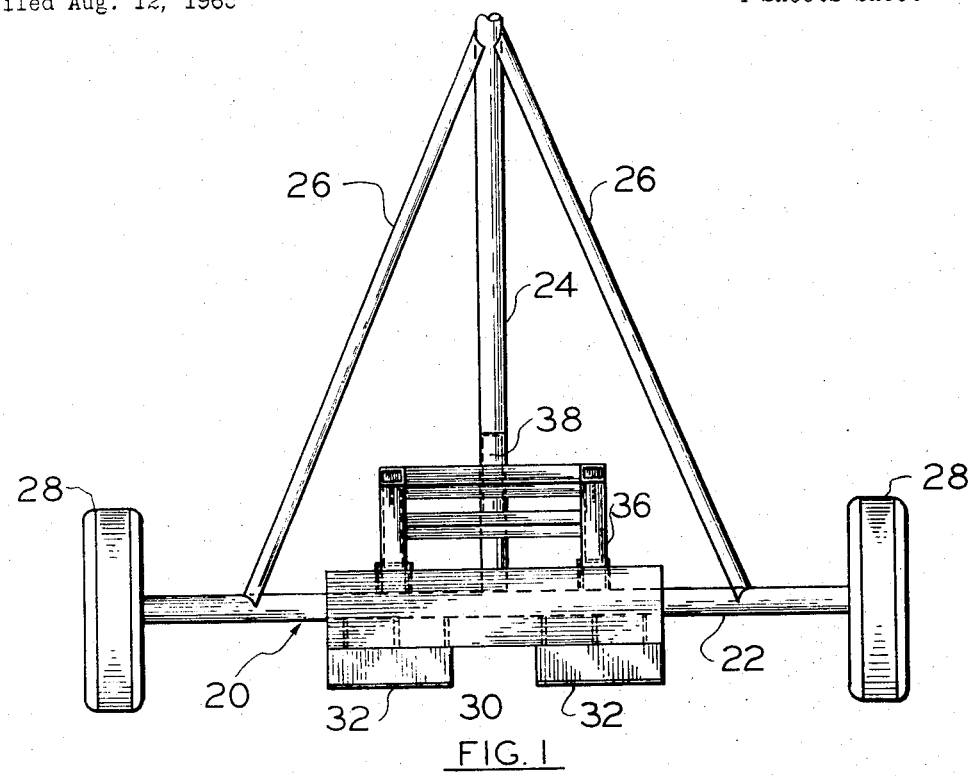
FIG. 1 is a top plan view of a trailer for transporting refuse containers constructed in accordance with the present invention.
Figure 2:
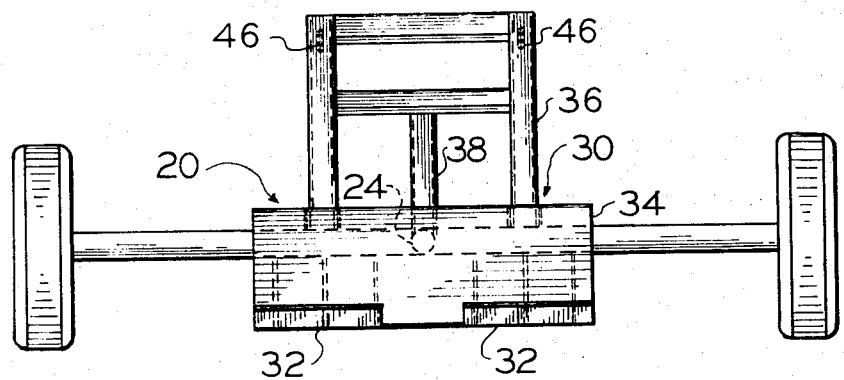
FIG. 2 is a front elevational view of the trailer shown in FIG. 1.

Referring in detail to the drawings, a trailer for transporting refuse containers and constructed in accordance with the present invention is illustrated in FIGS. 1 and 2 and includes a frame means indicated generally at 20.

Frame means 20 includes an axle means 22, a reach pole 24 connected to axle means 22, and a pair of support members 26 rigidly connected between reach pole 24 and axle means 22.

A pair of wheels 28 are rotatably mounted on each end of axle means 22 in a conventional manner.

Figure 3:
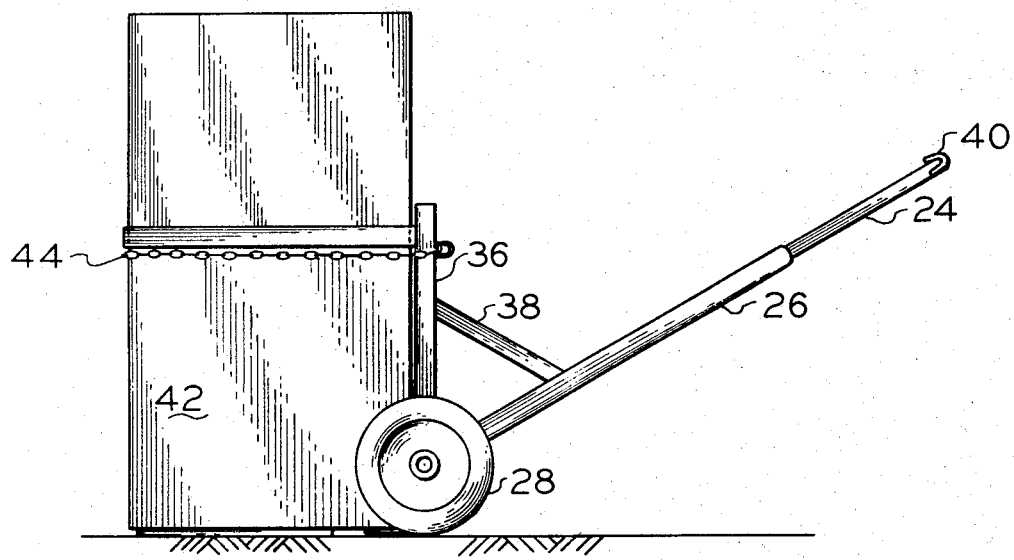
FIG. 3 is a side elevational view of the trailer shown in FIG. 1 illustrating a refuse container with the trailer and associated container engagement means in a lifting position.

Still referring to FIGS. 2 and 3, a container engagement means, indicated generally at 30, is rigidly connected to axle means 22 and, in one preferred form, includes a foot portion 32 and a bed portion 34. Bed portion 34 is provided with a supporting frame portion 36 which aids both in lifting and in carrying a refuse container. Supporting frame portion 36 includes a rearwardly inclined portion 38 which is rigidly connected to reach pole 24.

Now referring to FIGS. 3 and 4, the trailer illustrated in FIGS. 1 and 2 will be described in operation.

The user rolls the trailer toward a refuse container 42 which is to be transported. When engagement means 30 is in close proximity to the container 42 the user unhitches a conventional trailer hitch 40 which is mounted on the end of reach pole 24 to free the reach pole from the vehicle to which it is attached. Then reach pole 24 is manually raised to the degree shown in FIG. 3 which pivots engagement means 30 about the wheels 28 so that foot portion 32 is approximately horizontal. Then the trailer is rolled forward until the side wall of container 42 contacts bed portion 34 and foot portion 32 is positioned underneath container 42.

Figure 4:
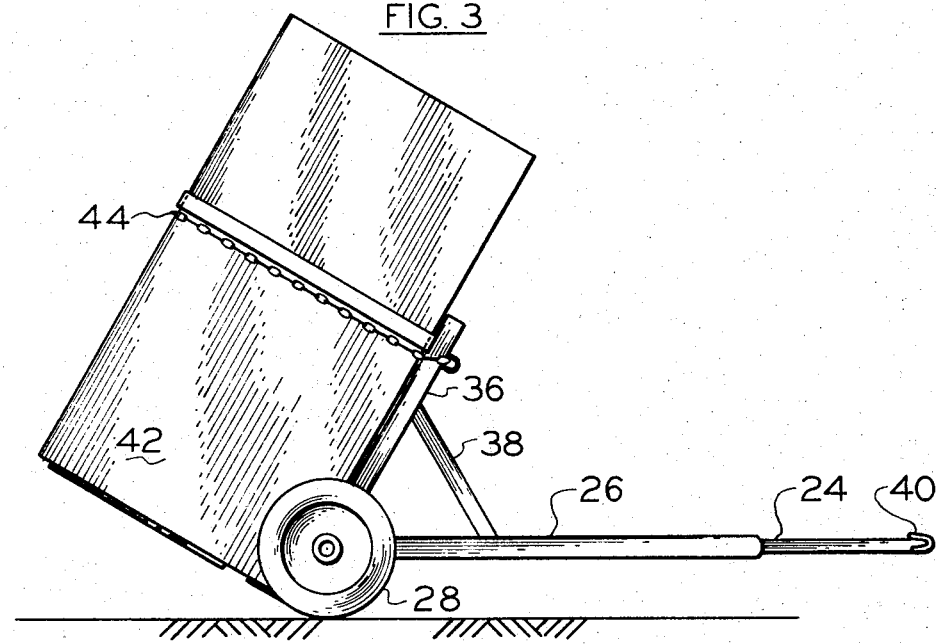
FIG. 4 is a side elevational view of the trailer and container shown in FIG. 3 after the container has been lifted onto the trailer, the trailer now being in a transporting position.

The user then pulls downwardly on the end of reach pole 24 to again pivot engagement means 30 about wheels 28 and thereby lift container 42 onto the trailer frame 20 and into the transporting position shown in FIG. 4. The trailer may then be hitched to the vehicle which is positioned at the proper distance under trailer hitch 40.

It is important to point out that in the embodiment illustrated and described in FIGS. 1–4, the container 42 is preferably one of the relatively smaller size standard containers as the leverage required to pivot the largest standard containers would require the length of reach pole 24 to exceed that of practical construction.

It is also important to point out that the form of engagement means 30 may be changed without departing from the spirit of the present invention.

For example, standard containers made by various manufacturers are equipped with a variety of lugs or other means which are adapted to engage with certain types of engagement means on lift and dump apparatus. The engagement means illustrated is preferred because such means will handle all of the various types of industrial refuse containers but other varieties of specialized engagement means could be used on the appropriate containers for lifting the containers onto the trailer.

A chain means 44 is provided to fit around container 42 and through holes 46, FIG. 2, in supporting member 36 and may be secured to insure the engagement between container 42 and engagement means 30.

Now with reference to FIGS. 5–9, a modified trailer for transporting refuse containers is illustrated. The identical reference numerals refer to those portions which are identical with the corresponding portions described in the embodiment of FIGS. 1–4.

The modified embodiment of FIGS. 5–9 differs essentially from the one of FIGS. 1–4 in that the container engagement means 30–A is pivotally mounted on axle means 22 by means of a bearing member 60 as best seen in FIG. 7. Engagement means 30–A which is rigidly connected to rotatably mounted bearing 60 is relatively free to rotate about axle means 22 while the reach pole 24 is stationary.

Figure 8:
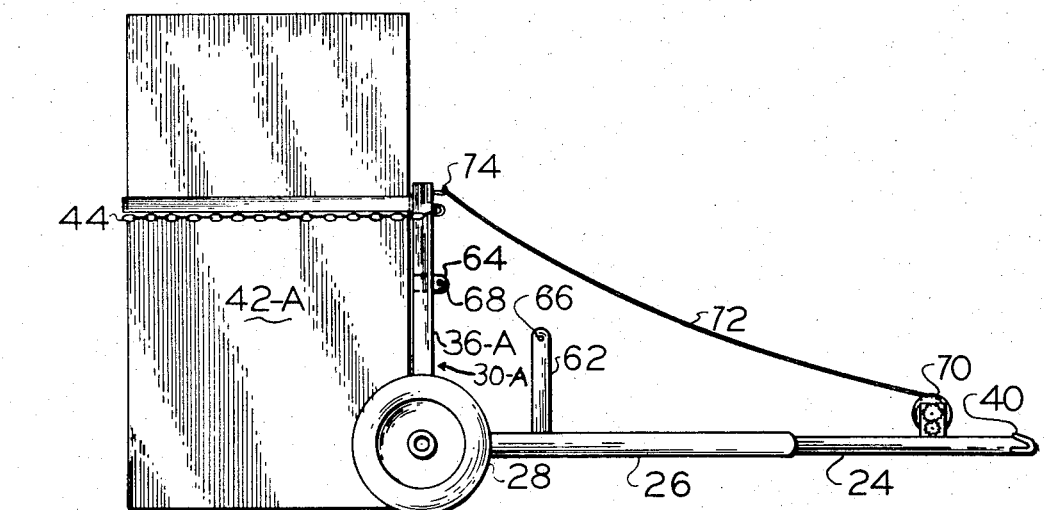
FIG. 8 is a side elevational view of the trailer of FIG. 5 in a lifting position with respect to a refuse container.

With reference to FIGS. 7 and 8, a stop means 62 is provided which is rigidly fastened to reach pole 24 to limit the degree of pivoting of engagement means 30–A in a clockwise direction as shown in FIG. 8. Stop means 62 also includes a hole 66 and further aids to support the weight of a container 42–A when the container is lifted onto the frame means 20.

Container engagement means 30–A is provided with cooperating means for securing the container in a loaded position which cooperating means includes a pair of flanges 64 on supporting frame member 36–A that include holes 68 which mate with hole 66 in stop means 62 when member 36–A is lowered to engage stop means 62. A detachable pin, not shown, may then be extended through holes 66 and 68 to lock engagement means 30–A in the position shown in FIG. 9.

A conventional winch 70 is attached to reach pole 24 and includes a line 72 which is connected to the upper portion of supporting frame member 36–A at 74.

In operation of the embodiment described in FIGS. 5–9, the user now does not have to remove the trailer hitch 40 from the towing vehicle. After the detachable pin, not shown, is removed from holes 66 and 68 and the winch line 72 is loosened sufficiently to permit engagement means 30–A to be pivoted to a position wherein foot portion 32–A is substantially horizontal and bed portion 34–A is substantially vertical, the vehicle and trailer are moved toward container 42–A until the side wall of container 42–A comes in contact with bed portion 34–A as seen in FIG. 8.

Figure 9:
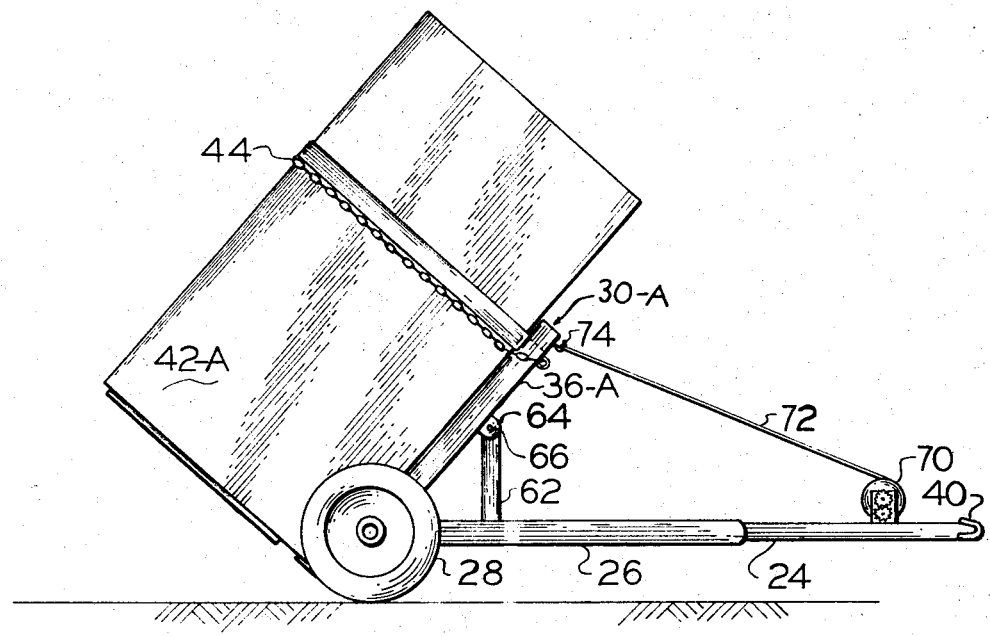
FIG. 9 is a side elevational view of the trailer of FIG. 5 in a transporting position after the container has been lifted onto the trailer.

Then chain means 44 is fastened about container 42–A and winch 70 is manually operated to increase the tension in line 72 which pivots engagement means 30–A and hence container 42–A about axle means 22 and into the transporting position shown in FIG. 9. Supporting frame member 36–A then comes to rest on stop means 62.

It is important to point out that the embodiment of FIGS. 5–9 is capable of lifting even the largest containers of standard size and in addition does not require the trailer to be unhitched from the towing vehicle.

After the container 42–A is lifted into the transporting position shown in FIG. 9, the detachable pin is replaced in holes 66 and 68 to prevent engagement means 30–A and container 42–A from pivoting back to the lifting position should the line 72 break accidentally.

While the forms of embodiments of the present invention as herein disclosed constitute preferred forms, it is to be understood that other forms might be adopted, all coming within the scope of the claims which follow.

I claim:

1. A towing trailer for transporting a refuse container having a bottom wall and a side wall substantially perpendicular to said bottom wall comprising in combination, frame means including axle means, a reach pole and wheel means rotatably connected to said axle means; container engagement means defining supports for said container including a foot portion and a bed portion pivotally mounted on said axle means, said foot portion and said bed portion being disposed at substantially right angles to one another, said bed portion being movable to a substantially vertical position in supporting engagement with said side wall of said container; means for pivoting said engagement means to lift said container onto said frame means; and stop means for limiting the degree of pivoting of said bed portion, said stop means being provided with a bore, said bed portion including flange means which engage said stop means, said flange means being provided with at least one bore aligned with said bore in said stop means; and pin means removably mounted through said bores to prevent pivotal movement of said engagement means.

2. A towing trailer for transporting a refuse container having a bottom wall and a side wall substantially perpendicular to said bottom wall comprising in combination, frame means including axle means, a reach pole and wheel means rotatably connected to said axle means; container engagement means defining supports for said container including a foot portion and a bed portion pivotally mounted on said axle means, said foot portion and said bed portion being disposed at substantially right angles to one another, said bed portion being movable to a substantially vertical position in supporting engagement with said side wall of said container; means for pivoting said engagement means to lift said container onto said frame means; and upwardly extending stop means on the frame forwardly of the axle means and cooperating means on the container engaging means to secure the container in a loaded position.

3. The apparatus of claim 2 wherein the means for pivoting said engagement means to lift said container is a winch and cable.

References Cited

UNITED STATES PATENTS

| 3,037,650 | 6/1962  | McConnell | 214—506   |
| 3,154,207 | 10/1964 | Long      | 214—501   |
| 3,261,482 | 7/1966  | Tate      | 214—501 X |

FOREIGN PATENTS

| 85,698 | 6/1958 | Denmark.     |
| 91,884 | 8/1959 | Netherlands. |

GERALD M. FORLENZA, *Primary Examiner.*

ALBERT J. MAKAY, *Examiner.*